Oct. 7, 1952
H. CARSON ET AL
2,613,072
SPEED CONTROL GOVERNING APPARATUS
Filed Nov. 23, 1945
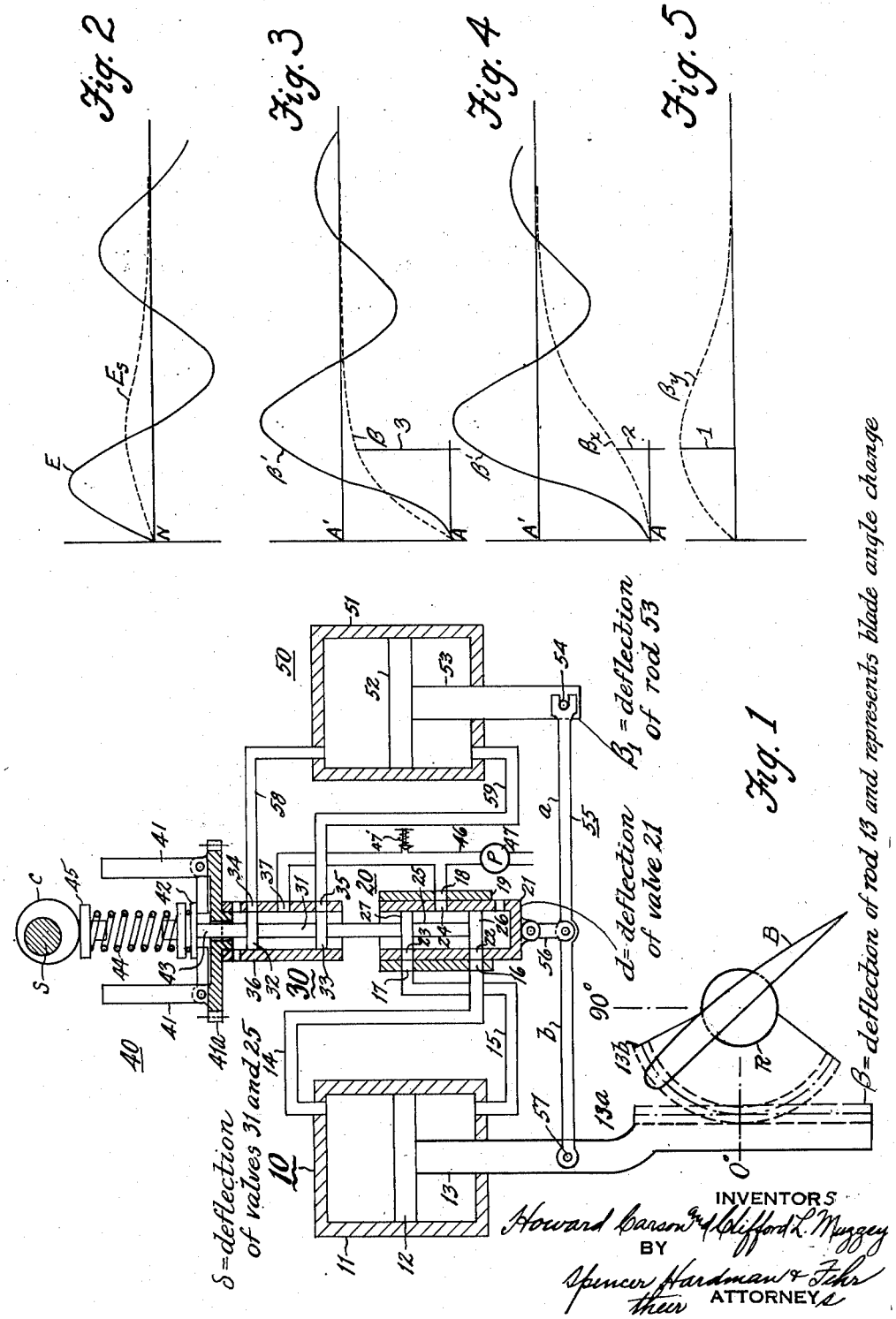

Patented Oct. 7, 1952

2,613,072

UNITED STATES PATENT OFFICE 2,613,072

SPEED CONTROL GOVERNING APPARATUS

Howard Carson and Clifford L. Muzzey, Dayton, Ohio, assignors to General Motors Corporation, Detroit, Mich., a corporation of Delaware Application November 23, 1945, Serial No. 630,378

5 Claims. (Cl. 264—4)

This invention relates to apparatus for governing the speed of an engine, for example, an airplane engine which drives a propeller. In that case, the apparatus would control engine speed by changing the pitch of the propeller blades. The present invention is not limited to control the propeller blade angle but may be applied to the control of the flow of the operating fluid as in a steam engine, or to the control of the fuel as in an internal combustion engine.

An object of the invention is to provide a stable governor. As disclosed herein, this object is accomplished by an hydraulic servo-motor which controls the operation of the speed controlling element or elements, for example, the variable pitch propeller blades, and a valve mechanism which so controls the servo-motor that the rate of movement of the speed controlling element is proportional to the amount of speed error and to the rate of change of speed error.

Further objects and advantages of the present invention will be apparent from the following description, reference being had to the accompanying drawing, wherein a preferred embodiment of the present invention is clearly shown.

In the drawing:

Fig. 1 is a diagrammatic illustration of the invention as applied to the governing of an aircraft engine speed by propeller pitch control.

Figs. 2 through 5 are charts showing its operation.

Blade pitch control servo 10 comprises cylinder 11, piston 12 and rod 13 having a rack 13a meshing with a gear segment 13b coaxial with root R of a propeller blade B. Pipes 14 and 15 connect cylinder 11 with ports 16 and 17 respectively of a fixed sleeve 19 having a pressure fluid inlet 18. Sleeve 19 is a part of a valve unit 20 which receives a movable sleeve valve 21 having ports 22, 23 and 24 registerable, respectively, with ports 16, 17 and 18. Sleeve 21 receives a valve 25 having lands 26 and 27. A valve unit 30 provides a valve 31 having lands 32 and 33 controlling ports 34 and 35 of a fixed sleeve 36 having a pressure fluid inlet 37. A governor 40 has flyweights 41 which engage a pad 42 of rod 43 which operates valves 25 and 31. Control spring 44 is located between pad 42 and a pad 45 which may be adjustable, for example, by a cam C rotated by a shaft S to vary the compression of spring 44. Weights 41 are pivotally supported by a gear 41a driven by the engine. Inlets 18 and 37 are connected by pipe 46 with an oil pump 47 having a pressure control valve 47'. Servo 50 comprises a cylinder 51, a piston 52 and a rod 53 carrying a pin 54 received by a notch in a lever 55 connected by a link 56 with sleeve valve 21 and by pin 57 with rod 13. Pipes 58 and 59 connect the cylinder 51 with ports 34 and 35, respectively.

It is apparent that the flow of pressure fluid into the servo cylinder 10 is controlled jointly by valve 25 actuated by governor 40 and by valve 21 actuated by piston 12 and also by piston 52 which is controlled by valve 31 actuated by the governor 40. The functions of this combination of elements can be understood better if the result to be accomplished is first explained by reference to Figs. 2 to 5 in which the horizontal distances represent time. In Fig. 2, line N represents a speed to be maintained and distances above and below the line N represent, respectively, positive and negative speed error. In Figs. 3 to 5, point A is a blade angle before the speed error and line A' is the blade angle required to correct the speed error.

Curve E of Fig. 2 represents the fluctuations of speed when the governing apparatus has no stabilizer, and curves $\beta'$ represent the concurrent fluctuations of blade angle. The slope of $\beta'$ is maximum when the slope of E is minimum and vice versa which means that the rate of blade angle change is proportional to the amount of speed error. When the rate of blade angle change is proportional only to amount of speed error, the governor lacks stability since there are many fluctuations of speed error accompanied by as many fluctuations of blade angle out of phase with speed error fluctuations by the time of fluctuation of speed error from zero speed error to the maximum value positive and negative. These fluctuations gradually diminish in amplitude and equilibrium may eventually be reached after a considerable lapse of time.

The present invention aims to minimize the fluctuations of speed error, one oscillation from zero error being the goal. This is represented by curve $E_s$ (Fig. 2), meaning governing action with stabilizer. Curve $\beta$ (Fig. 3) represents blade angle change required to correct speed error according to curve $E_s$. Curve $\beta$ is the resultant of curve $\beta_x$ (Fig. 4) and curve $\beta_y$ (Fig. 5). The slope of $\beta$ is proportional to the slopes of $\beta_x$ and $\beta_y$. The slope of $\beta_x$ is proportional to the amount of speed error represented by $E_s$. The slope of $\beta_y$ is proportional to the slope of $E_s$ or to the rate of change of speed error. Therefore the slope of $\beta$ which represents the rate of change of blade angle is proportional to the speed error and to the rate of change of speed error. The maximum stability of governing action is obtained when the rate at which the speed controlling element moves into a new position to maintain a required speed is proportional to the amount of speed error and to the rate of change of speed error. This is true whether the element be the variable pitch blades of a propeller driven by the engine or whether the element be the throttle valve of an engine.

It will now be demonstrated with respect to the present apparatus that the rate of change of blade angle $\beta$ is proportional to the amount of speed error $n$ and to the rate of change of speed error $n'$.

$$\dot{\beta} \text{ or } \frac{d\beta}{dt} = \text{rate of change of blade angle}$$

$$\dot{n} \text{ or } \frac{dn}{dt} = \text{rate of change of speed error}$$

The following demonstrates that $\beta$ varies as $n$ and $\dot{n}$:

$k_1$ is the constant of the governor 40.
$k_2$ is the constant of valve unit 30.
$k_3$ is the constant of valve unit 20.
$\delta$ is the deflection of valves 31 and 25.
$d$ is the deflection of sleeve valve 21.
$\beta_1$ is the deflection of piston 52 and rod 53.
$\beta$ is the deflection of rod 13 and represents blade angle change.
$a$ is the part of lever 55 between pin 54 and link 56.
$b$ is the part of lever 55 between link 56 and pin 57.
$\delta$ is proportional to speed error and equals $k_1 n$.
Rate of deflection of rod 53 is proportional to and equals $k_2 \delta$; therefore $$\dot{\beta}_1 \text{ or } \frac{d\beta_1}{dt} = k_2 \delta$$

For $\delta$ in this equation, substitute $k_1 n$; therefore $$\dot{\beta}_1 = k_1 k_2 n$$

$$\beta_1 = k_1 k_2 \int n \, dt$$

which means that deflection $\beta_1$ is proportional to integrated speed error.

$\dot{\beta}$ (or rate of change of blade angle) is proportional to the difference between deflections $\delta$ and $d$; therefore $$\dot{\beta} = k_3 (\delta - d)$$

In the above equation, substitute $k_1 n$ for $\delta$; therefore $$\dot{\beta} = k_3 (k_1 n - d)$$

Since $$d = \frac{1}{a+b} \cdot (a\beta - b\beta_1)$$

therefore $$\dot{\beta} = k_3 k_1 n - \frac{1}{a+b} \cdot (a\beta - b\beta_1)$$

Since $$\beta_1 = k_1 k_2 \int n \, dt$$

$$\dot{\beta} = k_3 \left[ k_1 n - \frac{1}{a+b} \cdot (a\beta - b k_1 k_2 \int n \, dt) \right]$$

$$\dot{\beta} = k_1 k_2 \left(\frac{b}{a}\right) \int n \, dt + k_1 \left(\frac{a+b}{a}\right) n - \frac{\beta}{k_3} \left(\frac{a+b}{a}\right)$$

$$\dot{\beta} = k_1 k_2 \left(\frac{b}{a}\right) n = k_1 \left(\frac{a+b}{a}\right) \dot{n} - \frac{\ddot{\beta}}{k_3} \left(\frac{a+b}{a}\right)$$

(Term $$-\frac{\ddot{\beta}}{k_3}\left(\frac{a+b}{a}\right)$$

is the lag factor, and is proportional to the acceleration of blade angle change.)

$\dot{\beta}$ is proportional to $n$ and to $\dot{n}$ which means that rate of blade angle change is proportional to the speed error and to the rate of change of speed error.

The term $$k_1 k_2 \left(\frac{b}{a}\right) \int n \, dt$$

expresses the component of blade $\beta$ movement which will be called $\beta_x$. The $\beta_x$ movement is that resulting from movement $\beta_1$ (movement of piston 52), valve 25 being considered as stationary. When piston 52 moves down as result of upward movement of valve 31 due to positive speed error $n$, $\beta_x$ movement up is $$\frac{b}{a}\beta_1$$

Since servo 50 operates to shift valve 21 down to open port 23 to pressure, and valve 21 is shifted up to equilibrium position by upward movement of piston 12 the distance $\beta_x$, the result is the same as if valve 21 were fixed and servo 50 operated directly to move rod 13 up the distance $\beta_x$. If $$\beta_x = \frac{b}{a}\beta_1$$

and $$\beta_1 = k_1 k_2 \int n \, dt$$

then $$\beta_x = k_1 k_2 \left(\frac{b}{a}\right) \int n \, dt$$

therefore $\beta_x$ varies as $\int n \, dt$ and $\dot{\beta}_x$ (rate of change of $\beta_x$) varies as $n$.

Let $\beta_y$ denote that component of $\beta$ resulting from movement of valve 25 due to speed error $n$, piston 52 being stationary. On moving up, valve 25 uncovers port 23, and piston 12 moves up until valve 21 (moved by piston 12) has blocked port 23. Valve 25 moves distance $k_1 n$. Valve 21 moves distance $\delta$ which equals $k_1 n$. Piston 12 moves distance $$\frac{a+b}{a} \cdot \delta$$

or $$\frac{a+b}{a} \cdot k_1 n$$

therefore $$\beta_y = \frac{a+b}{a} \cdot k_1 n$$

$\beta_y$ varies as $n$.
$\dot{\beta}_y$ varies as $\dot{n}$.
$\dot{\beta}_y$ (rate of change of $\beta_y$) varies as $\dot{n}$ (rate of change of speed error).

Since components $\dot{\beta}_y$ and $\dot{\beta}_x$ vary respectively as $\dot{n}$ (rate of change of speed error) and $n$ (amount of speed error), $\dot{\beta}$ (rate of change of blade angle) varies as $\dot{n}$ (rate of change of speed error) and as $n$ (amount of speed error).

In Fig. 2, curve E represents fluctuation of speed error without stabilizer, and $E_s$ shows the rapid correction of speed error with stabilizer.

In Figs. 3 and 4, curve $\beta'$ represents blade angle change without stabilizer. Curve $\beta$ in Fig. 3 represents blade angle change with stabilizer. The slope of curve $\beta$ is $$\frac{d\beta}{dt} \text{ or } \dot{\beta}$$

and is proportioned to $\dot{n}$ and $n$.

In Fig. 4, curve $\beta_x$ is that component of $\beta$ which may be attributed to movement of piston 12 as controlled by movement of piston 52, valve 25 being stationary. The instantaneous values denoted by $\beta_x$ are proportional to $\int n \, dt$. The slope of curve $\beta_x$ is $$\frac{d\beta_x}{dt}$$

or $\dot{\beta}_x$ which is proportional to $n$.

In Fig. 5, curve $\beta_y$ is that component of $\beta$ which may be attributed to movement of piston 12 due to movement of valve 25 in response to speed error and follow-up by valve 21, piston 52 being stationary. The instantaneous values denoted by $\beta_y$ are proportional to $n$. The slope of curve $\beta_y$ is $$\frac{d\beta_y}{dt}$$

or $\dot{\beta}_y$ which is proportional to $\dot{n}$ or the slope of curve $E_s$.

Curve $\beta$ denotes the algebraic sum of curves $\beta_x$ and $\beta_y$. Its slope $\dot{\beta}$ comprises slope components $\dot{\beta}_x$ and $\dot{\beta}_y$ which are proportional respectively to $n$ and $\dot{n}$. Therefore $\dot{\beta}$ (slope of curve $\beta$) is proportional to $n$ and $\dot{n}$.

Stability of control is obtained because, as indicated by curve $\beta$, blade angle changes rapidly as speed error starts to increase, thereby retarding increase of speed error so that its maximum will be low. Even before positive speed error reaches maximum, the rate of blade angle change decreases, and continues to decrease as speed error decreases. In this way speed error is limited to a low maximum; and it gradually reduces to zero, without going to a negative value.

Correction of negative speed error is just the reverse of correction of positive speed error.

Valve unit 20 may be considered as uniting components $\beta_x$ and $\beta_y$ of $\beta$.

In the foregoing description of the operation of the elements in Fig. 1, it has been assumed for the purpose of analyzing the operation of the valve parts that one or another of certain of the valve parts remain stationary while others of the valve parts perform their several and contributary functions. It will be understood of course, that these valve parts operate concurrently to produce their component functions of the complete operation.

Another way of stating the action of the speed governor, when increasing the blade angle in order to correct an overspeed or positive speed error, is that there is an upward displacement of piston 12 so long as there is any relative displacement of valves 25 and 21 from a position in which the lands 26 and 27 register with the ports 22 and 23. While the speed error is increasing (upward slope of curve $E_s$) valve 25 is moving up and piston 52 is moving down. Therefore, there is a displacement of valve 25 upwardly relatively to valve 21 while at the same time there is a downward displacement of valve 21 relative to valve 25. Consequently piston 12 moves up at a rate which is greater than would be the case if valve 25 were considered stationary and valve 21 were displaced downwardly or as would be the case if valve 21 were considered stationary while valve 25 were displaced upwardly. Up to the time that speed error reaches the maximum value piston 12 moves upwardly relatively rapidly thereby increasing the blade angle to a value closely approaching that value that it must be in order to eliminate the speed error. The displacement of the blade is represented by line 3 in Fig. 3 which is the sum of the line 2 of Fig. 4 and line 1 of Fig. 5.

While speed error is diminishing there is downward movement of valve 25 while there is retarded downward movement of valve 21. Since these valves are now moving in the same direction, the piston 12 is not required to move nearly so far upwardly in order to bring the valves 21 and 25 to equilibrium position. The operation of the device is to quickly check an overspeed error by causing, first a rapid upward movement of piston 12 so that the speed error will increase only to a relatively small value, and the effect a final upward movement of the piston 12 at a rapidly decreasing rate so as not to over-correct for the positive speed error and cause a negative error by such over-correction. In other words, the ideal way would be to arrive at the limit of blade angle increase about the time the speed error reduced to zero. As previously explained, this is accomplished by causing the piston 12 to be displaced upwardly in proportion to integrated speed error, the values of which are represented by line $\beta_x$ in Fig. 4 and in proportion to amount of speed error, the values of which are represented by line $\beta_y$ in Fig. 5.

An under-speed or negative speed error is corrected in the same manner by relative movements of the parts in directions opposite to those above mentioned.

While the embodiment of the present invention as herein disclosed, constitutes a preferred form, it is to be understood that other forms might be adopted, all coming within the scope of the claims which follow.

What is claimed is as follows:

1. Governing apparatus comprising an hydraulic servo-motor having a cylinder and a piston, a fluid pressure source, means operated by the piston for controlling the speed of a prime-mover, a valve mechanism for connecting the source with said cylinder, said valve mechanism including a valve guide providing an intake port connected with the source and distribution ports connected with opposite ends of the cylinder, and two cooperable valve elements each movable relative to said valve guide for jointly controlling connection between the intake port and the distribution ports, centrifugal means for positioning one of the valve elements in accordance with the amount of speed error, and means including a pilot valve actuated by said centrifugal means, a piston controlled by the pilot valve, and a floating lever pivoted intermediate its length to the other valve element and at its ends to the first mentioned piston and to the last recited piston for positioning said other valve element in accordance with integrated speed error, whereby the position of the piston is under joint control of speed error and integrated speed error, and whereby the rate of movement of the piston is proportional to rate of change of speed error and to the amount of speed error.

2. A governing apparatus for controlling the speed of a prime mover, comprising a hydraulic servomotor having a cylinder and a piston which positions a speed controlling element for said prime mover, and a valve mechanism for controlling flow of pressure fluid into one end or the other of the cylinder comprising, a valve guide having a pressure inlet port connected with a pressure source and distribution ports connected respectively with opposite ends of the cylinder, a sleeve valve having ports which in equilibrium position thereof register respectively with the ports of the valve guide, a spool valve having lands which in the equilibrium position of the spool valve register with the distribution ports of the sleeve valve, centrifugal means for deflecting one of the valves in proportion to the amount of the speed error, and including a pilot valve actuated by said centrifugal means, a piston controlled by the pilot valve, and a floating lever pivoted intermediate its length to the other valve element and at its ends to the first mentioned piston and to the last recited piston for deflecting the other valve in proportion to the amount of integrated speed error.

3. A governing apparatus for controlling speed, comprising a fluid servomotor having a cylinder and piston, and a valve mechanism for controlling flow of pressure fluid into one end or the other of the cylinder comprising, a valve guide having a pressure inlet port connected with a pressure source and pressure distribution ports connected respectively with opposite ends of the cylinder, a sleeve valve having a supply port and distribution ports which in the equilibrium position thereof register respectively with the ports of said valve guide, a spool valve having lands which in the equilibrium position of the spool valve register with the distribution ports of the sleeve valve, means for applying the fluid pressure at the said valve mechanism to the servo cylinder in response to amount of speed error, means actuated by the servo cylinder for modifying the application of said fluid pressure in response to rate of change of speed error, including centrifugal means for deflecting one of said valves in proportion to the amount of speed error, and means including a pilot valve actuated by said centrifugal means, a piston controlled by the pilot valve and a floating lever pivoted intermediate its length to the other valve element and at its ends to the first mentioned piston and to the last recited piston for deflecting the other valve in proportion to the amount of integrated speed error.

4. The combination set forth in claim 2, wherein the sleeve valve is deflected in proportion to the amount of integrated speed error.

5. The combination set forth in claim 2, wherein the spool valve is deflected in proportion to the amount of speed error.

HOWARD CARSON.
CLIFFORD L. MUZZEY.

REFERENCES CITED

The following references are of record in the file of this patent:

UNITED STATES PATENTS

| Number | Name | Date |
|---|---|---|
| 1,891,096 | Kraft | Dec. 13, 1932 |
| 1,976,659 | Dickinson | Oct. 9, 1934 |
| 2,197,743 | Crafts et al. | Apr. 16, 1940 |
| 2,229,058 | Dicks | Jan. 21, 1941 |
| 2,346,856 | Martin | Apr. 18, 1944 |
| 2,358,894 | Volet | Sept. 26, 1944 |
| 2,375,429 | Martin | May 8, 1945 |
| 2,391,323 | Martin | Dec. 18, 1945 |
| 2,399,685 | McCoy | May 7, 1946 |
| 2,422,966 | Hoover | June 24, 1947 |
| 2,455,378 | McCoy | Dec. 7, 1948 |

FOREIGN PATENTS

| Number | Country | Date |
|---|---|---|
| 600,855 | Germany | Aug. 2, 1934 |